US012625234B2

(12) United States Patent
Regev

(10) Patent No.: US 12,625,234 B2
(45) Date of Patent: May 12, 2026

(54) NAVIGATION SYSTEM AND METHOD WITH CONTINUOUSLY UPDATING ML

(71) Applicant: Israel Aerospace Industries Ltd., Lod (IL)

(72) Inventor: Omer Regev, Maccabin-Reut (IL)

(73) Assignee: Israel Aerospace Industries Ltd., Lod (IL)

( * ) Notice: Subject to any disclaimer, the term of this patent is extended or adjusted under 35 U.S.C. 154(b) by 308 days.

(21) Appl. No.: 18/568,926

(22) PCT Filed: Jun. 8, 2022

(86) PCT No.: PCT/IL2022/050610
§ 371 (c)(1),
(2) Date: Dec. 11, 2023

(87) PCT Pub. No.: WO2022/264120
PCT Pub. Date: Dec. 22, 2022

(65) Prior Publication Data
US 2024/0280670 A1 Aug. 22, 2024

(30) Foreign Application Priority Data
Jun. 17, 2021 (IL) .......................................... 284155

(51) Int. Cl.
*G01S 7/41* (2006.01)
*G01S 13/86* (2006.01)
*G01S 13/937* (2020.01)

(52) U.S. Cl.
CPC ............ *G01S 7/417* (2013.01); *G01S 13/867* (2013.01); *G01S 13/937* (2020.01)

(58) Field of Classification Search
CPC ....... G01S 7/417; G01S 13/937; G01S 13/867
See application file for complete search history.

(56) References Cited

U.S. PATENT DOCUMENTS 10,408,939 B1     9/2019  Kim et al.
10,451,712 B1 *  10/2019  Madhow .............. G01S 13/723
(Continued)

FOREIGN PATENT DOCUMENTS

CN         111856448 A       10/2020

OTHER PUBLICATIONS

Zhang , et al., "Transfer Learning with Convolutional Neural Networks for SAR Ship Recognition", IOP Conference: Materials Science and Engineering vol. 322. doi:10.1088/1757-899X/322/7/072001, 2018, pp. 1-5.

(Continued)

*Primary Examiner* — William Kelleher
*Assistant Examiner* — Hailey R Le
(74) *Attorney, Agent, or Firm* — Ballard Spahr LLP

(57) ABSTRACT

A marine vessel management system, comprising: receiving input data comprising at least radar input data indicative of a first field of view and imagery input data indicative of a second field of view being at least partially overlapping with said first field of view. Processing the input data to determine data indicative of reflecting object(s) within an overlapping portion of said first field of view. Determining respective locations(s) within said second field of view, where said reflecting object(s) are identified, and obtaining radar meta-data of said reflecting object(s); processing said input imagery data said respective locations in an overlapping portion of said second field of view. Determining image data piece (s) corresponding with section(s) of said imagery data associated with said reflecting object(s). Using said radar meta-data for generating label data and generating output data comprising said image data section(s) and said label data.

20 Claims, 5 Drawing Sheets

(56)  References Cited

U.S. PATENT DOCUMENTS

| | | | | |
|---|---|---|---|---|
| 2017/0307735 A1* | 10/2017 | Rohani | .................... | G01S 13/89 |
| 2019/0135400 A1 | 5/2019 | Pietola et al. | | |
| 2020/0050893 A1* | 2/2020 | Suresh | ..................... | G06N 3/08 |
| 2020/0074239 A1* | 3/2020 | Park | ......................... | G06V 20/64 |
| 2020/0103499 A1 | 4/2020 | Preece et al. | | |
| 2020/0174112 A1 | 6/2020 | Xing et al. | | |
| 2020/0184718 A1 | 6/2020 | Chiu et al. | | |
| 2020/0264300 A1 | 8/2020 | Rostami et al. | | |
| 2020/0278433 A1 | 9/2020 | Vanhakartano et al. | | |
| 2021/0103781 A1 | 4/2021 | Vigren et al. | | |
| 2021/0396525 A1 | 12/2021 | Hara et al. | | |
| 2023/0022049 A1* | 1/2023 | Patterson | .............. | G01S 13/726 |

OTHER PUBLICATIONS

Patel , et al., "Deep Learning-Based Object Classification on Automotive Radar Spectra", 2019 IEEE Radar Conference (Radarconf), Apr. 22, 2019, 6 pages.

* cited by examiner

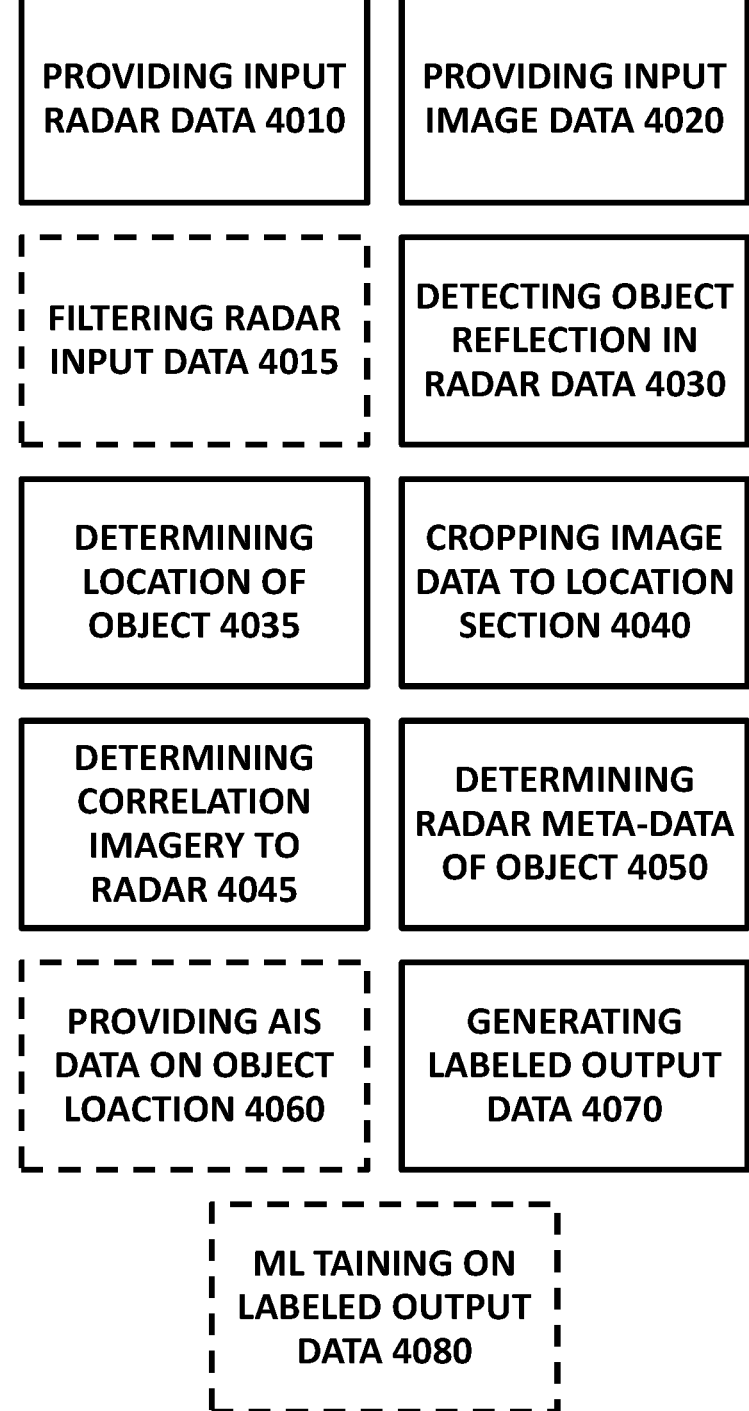

PROVIDING INPUT RADAR DATA 4010

PROVIDING INPUT IMAGE DATA 4020

FILTERING RADAR INPUT DATA 4015

DETECTING OBJECT REFLECTION IN RADAR DATA 4030

DETERMINING LOCATION OF OBJECT 4035

CROPPING IMAGE DATA TO LOCATION SECTION 4040

DETERMINING CORRELATION IMAGERY TO RADAR 4045

DETERMINING RADAR META-DATA OF OBJECT 4050

PROVIDING AIS DATA ON OBJECT LOACTION 4060

GENERATING LABELED OUTPUT DATA 4070

ML TAINING ON LABELED OUTPUT DATA 4080

FIG. 4

NAVIGATION SYSTEM AND METHOD WITH CONTINUOUSLY UPDATING ML

TECHNOLOGICAL FIELD

The present invention relates to technique of automatic navigation, traffic avoidance, and anti-collision using AI (Artificial Intelligence) control technology, and specifically relates to autonomically and automatically updated AI by using automatic and "on the fly" machine learning training in maritime traffic and marine environment.

BACKGROUND

The raising interest in autonomous vehicle is also directed at autonomous marine vessels. Although marine environment and paths may pose a promising candidate for autonomous navigation and handling, the existing IMO (International Maritime Organization) regulations and rules direct a presence of a 24/7 human lookout by sight on the bridge of the vessel, as to make a full appraisal of the situation and of the risk of collision. Such regulations direct the use of optical imaging and optical image processing as input for automatic or autonomous lookout function and navigational control of the vessel.

GENERAL DESCRIPTION

Autonomous or automatic control of marine vessels generally requires operation of the vessel in several aspects including navigation, avoidance of obstacles, and resolution of path and traffic conflicts with other vessels. As marine regulations require use of visual input, by the use of human lookout by sight to make a full appraisal of the situation and of the risk of collision. The control over automatic and autonomous navigation of marine vessels requires processing of visual optical inputs. To this end, a proper control system for such automatic or autonomous navigation of a marine vessel is trained for detecting and analyzing various objects in different visual conditions to enable object detection, object classification and determining characteristics of object behavior, as well as route re-planning or temporary route alteration to avoid collision and to timely resolve various navigational conflicts or potential conflicts that may arise.

To enable automatic and/or autonomous marine navigation in various conditions, while following the regulation, the present technique provides ongoing learning and training of AI technology by an automatic and "on the fly" machine learning control to enable detection, classification and generating behavior profile of various objects in various visual conditions.

To this end, the present invention utilizes a sensing arrangement on the marine vessel including one or more optical imagers (such as one or more camera units) and one or more radar systems, and a navigational control system (control system) comprising one or more computer processors and memory unit. The control system may also comprise local or remote displays and one or more ship control units providing control over ship autopilot and engines throttle, and ship interface units. The control system generally comprises input and output communication ports operatively connected to the sensing arrangement for receiving input image data and input radar data. The control system is generally connected to vessel engines and steering navigation modules to control steering and thrust of the vessel, thereby controlling, piloting, and navigating the vessel.

The control system may further include one or more processing modules including for example safety module configured for receiving and processing input data, at least image data, and determining risk levels associated with objects around the vessel or in path thereof and auto-captain module configured for receiving and processing data on vessel and environment around it, applying on or more decision-making algorithms, and generating operation commands to the engines and steering modules. The control system may also comprise additional modules such as efficiency module for monitoring and optimizing fuel use of the vessel; cyber security module configured for monitoring and verifying data communications to limit security breaches. Generally, the control system may include an object analyzing module configured for receiving input imagery data from the one or more imagers, identify one or more objects within the imagery data, determine one or more classification data of so-identified objects and provide corresponding output to at least one of the safety module and auto-captain module. Typically, in marine environment, the object analyzing module may be trained for detecting, recognizing, and classifying various types of marine vessels including e.g., ships, boats, rafts, obstacles, various platforms (e.g., oil rig), etc., as well as analyze behavior profile of such marine vessels over stationary objects. Additionally, the analyzing module may be trained to determine object characteristics such as object lights, smoke, flags, shape, sails, vessel vector and maneuvers, rear water trail, front (nose) water wave, water foam and more. Further, the object analyzing module may be trained for recognizing land regions such as islands and shore.

Generally, the object analyzing module, as well as one or more of the safety module and auto-captain module may utilize corresponding artificial intelligence (AI) processing modules. To this end, the AI modules are typically trained on various scenarios and in accordance with marine regulations. The present technique generally provides the marine vessels with retraining and continuous learning abilities utilizing ongoing training of the object analyzing module to detect and classify various types of objects the vessel may encounter. To this end, the present technique utilizes a training data generator module connectable to the sensing arrangement for receiving input data including imagery input data and radar input data, and to process the input data for generating one or more labeled image sections associated with objects found around the vessel. Each image data section is a cut section of one or more input image frames, depicting an object, and including a meta-data label providing one or more classification data on the object.

More specifically, the training data generator is configured and operable for receiving input data from the sensing arrangement. The input data comprise imagery data obtained by the one or more imagers/camera units and radar input data obtained by the one or more radar units. The radar input data is indicative of a first field of view and imagery input data is indicative a second field of view being at least partially overlapping with said first field of view. The training data generator is configured to process the radar input data to determine data indicative of one or more reflecting objects and determines data on the reflecting objects including respective location and radar meta-data of the objects. The training data generator is further configured to process the input imagery data for detecting one or more objects within the imagery data. Generally, the training data generator may process the imagery data within respective locations of the objects detected in the radar input data, to determine one or more image data pieces corresponding with one or more sections of said imagery data associated with the one or more reflecting objects. The training data generator may operate to determine correlation between object characteristics obtained from the radar input data and the respective objects detected in the imagery data. The correlation level may be used to determine useability of data on the detected object, where score threshold may be selected in accordance with weather and visibility condition, and day or night conditions.

Using the radar meta-data, the training data generator creates labeling data and thus generates output data comprising said one or more image data sections and the corresponding label data. The labeling data may also include object characteristics determined from processing of the imagery data providing imagery meta-data, and data associated with correlation between the imagery data section and reflection radar data. The output data may typically be in the form of labeled image data pieces indicative of objects found around the marine vessel and corresponding radar meta-data. Accordingly, the training data generator facilitates a connection between meta-data obtain from radar input data and image data of one or more objects and thus enables machine learning training for object detection based on said imagery data. The training data generator may enhance the corresponding label data with the vessel systems data and the almanac databases.

The training data generator may thus continuously generate labeled image data pieces, for various objects found in surroundings of the marine vessel and utilizes the labeled image data pieces to enable continuous and on-the-fly training of AI modules associated with at least one of the object analyzing module, safety module, and auto-captain module. Thus, enabling continuous training of the vessels AI modules using automated machine learning, while operating the vessel.

Thus, according to a broad aspect, the present invention provides a method, e.g., implemented by one or more processors and memory circuit, comprising: receiving input data comprising at least radar input data indicative of a first field of view and imagery input data indicative of a second field of view being at least partially overlapping with said first field of view; processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data.

According to some embodiments, the radar meta-data comprises one or more data pieces indicative of radar signature of one or more objects reflecting said radar signal.

According to some embodiments, the radar meta-data comprises one or more data pieces selected from the group of: object size, object distance, object closing speed, object aspect, object location, Angles, azimuth, vector, Doppler, cross section & signature.

According to some embodiments, the method may further comprise providing said output data comprising one or more image data pieces and labeling data for training processing of one or more artificial intelligence (AI) modules to thereby enable continuous training for object recognition and/or classification in said imagery data.

According to some embodiments, the AI module is adapted for object detection in marine environment, enabling collision prevention in a marine vessel in accordance with said imagery data.

According to some embodiments, the AI module is further configured for receiving location data from one or more location detection units (GPS) and for determining navigational route of said marine vessel.

According to some embodiments, the AI module is connectable to steering controls of said marine vessel, thereby enabling at least partially autonomous operation of said marine vessel. For example, the auto-captain module may be connected to driving controls and driving system of the vessel.

According to some embodiments, the method may further comprise processing the radar input data to determine data indicative of one or more reflecting objects within an said first field of view, and upon determining that one or more respective locations where reflecting objects are identified being outside of said second field of view, generating an operation command to obtain imagery data from said one or more respective locations.

According to some embodiments, the method may further comprise providing data on position of said one or more reflecting objects and utilizing an automatic identification system (AIS) and said position of said one or more reflecting objects to obtain data on identity of said one or more reflecting objects, using said data on identity for generating additional label data and generating output data comprising said one or more image data sections and said label data and said additional label data.

According to another broad aspect the present invention provides a marine vessel management system comprising at least one processor and memory circuit, one or more camera units and one or more radar units, the at least one processor comprises an auto-captain module, object detection training module, and training data generator;

the auto-captain module comprises an artificial intelligence (AI) module continuously trainable based on labeled image data and is configured to receive imagery data from said one or more camera units, processing said imagery data to determine data on one or more objects within a selected field of view around said marine vessel;

the training data generator is configured and operable for receiving input data from said one or more camera units and one or more radar units, said input data comprises at least radar input data indicative of a first field of view and imagery input data indicative a second field of view being at least partially overlapping with said first field of view, processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data;

the object detection training module is configured to receive said output labeled data, and update training of said AI module of said auto-captain module for detecting objects based on said output labeled data, thereby enable continuously updating training of said AI module.

According to some embodiments, the AI module is adapted for processing input imagery data received from said one or more camera unit and determine data on one or more objects identified in said imagery data, to thereby provide object recognition of one or more objects from said imagery data.

According to some embodiments, the radar meta-data comprises one or more data pieces indicative of radar signature of one or more objects reflecting said radar signal.

According to some embodiments, the radar meta-data comprises one or more data pieces selected from the group of: object size, object distance, object closing speed, object aspect, object location, Angles, azimuth, vector, Doppler, cross section, and signature.

According to some embodiments, the AI module is further configured for receiving location data from one or more location detection units (GPS) and for determining navigational route of said marine vessel.

According to some embodiments, the auto-captain module is connectable to steering controls of said marine vessel and configured for varying at least one of speed and heading of said marine vessel to thereby enable at least partially autonomous operation of said marine vessel.

According to some embodiments, the system may further comprise processing the radar input data to determine data indicative of one or more reflecting objects within an said first field of view, and upon determining that one or more respective locations where reflecting objects are identified being outside of said second field of view, generating an operation command to obtain imagery data from said one or more respective locations.

According to some embodiments, the system may, further comprise automatic identification system (AIS) module, wherein said training data generator is further configured to provide data on position of said one or more reflecting objects and obtain from said AIS module data on identity of marine vessels located at said position, using said data on identity for generating additional label data and generating output data comprising said one or more image data sections and said label data and said additional label data.

According to yet another broad aspect, the present invention provides a system for generating labeled training data, the system comprising a processing utility comprising one or more processors, memory unit, and communication module connectable to one or more camera units and one or more radar units; the processing utility is configured for receiving input data comprising at least radar input data indicative of a first field of view and imagery input data indicative of a second field of view being at least partially overlapping with said first field of view; processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data.

According to some embodiments, the processing utility comprises a radar reflection detector, radar signature processing module, and FOV analyzer; said radar reflection detector is configured to receive input data from the one or more radar units and determine data of one or more radar signal reflections indicative of one or more objects in field of view of the one or more radar units, and location of said one or more objects; the radar signature processing module is configured to receive and process data on said radar signal reflections and determine data on radar signature of said one or more objects; said FOV analyzer is configured to receive input imagery data from said one or more camera units and said data on location of said one or more object, and to process the input imagery data to determine one or more image data pieces associated with said location of said one or more objects; the processing utility generates output data comprising said image data pieces and labeling data associated with said data on radar signature of said one or more objects thereby generating labeled training data for training of one or more artificial intelligence (AI) modules.

According to some embodiments, the radar meta-data comprises one or more data pieces indicative of radar signature of one or more objects reflecting said radar signal.

According to some embodiments, the radar meta-data comprises one or more data pieces selected from the group of: object size, object distance, object closing speed, object aspect, object location, Angles, azimuth, vector, Doppler, cross section, and signature.

According to some embodiments, the processing utility is further configured to provide said output data comprising one or more image data pieces and labeling data for training processing of one or more AI modules to thereby enable continuous training for object detection in said imagery data.

According to some embodiments, the one or more AI modules being adapted for object detection in marine environment, enabling collision prevention in a marine vessel in accordance with said imagery data.

According to some embodiments, the one or more AI modules being further configured for receiving location data from one or more location detection units (GPS) and for determining navigational route of said marine vessel.

According to some embodiments, the one or more AI modules are connectable to steering controls of said marine vessel, thereby enabling at least partially autonomous operation of said marine vessel.

According to some embodiments, the processing unit is configured to generate an operation command to obtain imagery data from additional one or more respective locations in response to identifying data indicative of one or more reflecting objects within an said first field of view and determining that one or more respective locations where reflecting objects are identified being outside of said second field of view.

According to some embodiments, the system may further comprise automatic identification system (AIS) module, wherein said training data generator is further configured to provide data on position of said one or more reflecting objects and obtain from said AIS module data on identity of marine vessels located at said position, using said data on identity for generating additional label data and generating output data comprising said one or more image data sections and said label data and said additional label data.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Thus, according to yet another broad aspect, the present invention provides a program storage device readable by machine, tangibly embodying a program of instructions executable by the machine to perform a method implemented by one or more processors and memory circuit, the method comprising: receiving input data comprising at least radar input data indicative of a first field of view and imagery input data indicative of a second field of view being at least partially overlapping with said first field of view; processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4 illustrates a technique for continuously generating labeled training data according to some embodiments of the present invention;

DETAILED DESCRIPTION OF EMBODIMENTS

Figure 1:
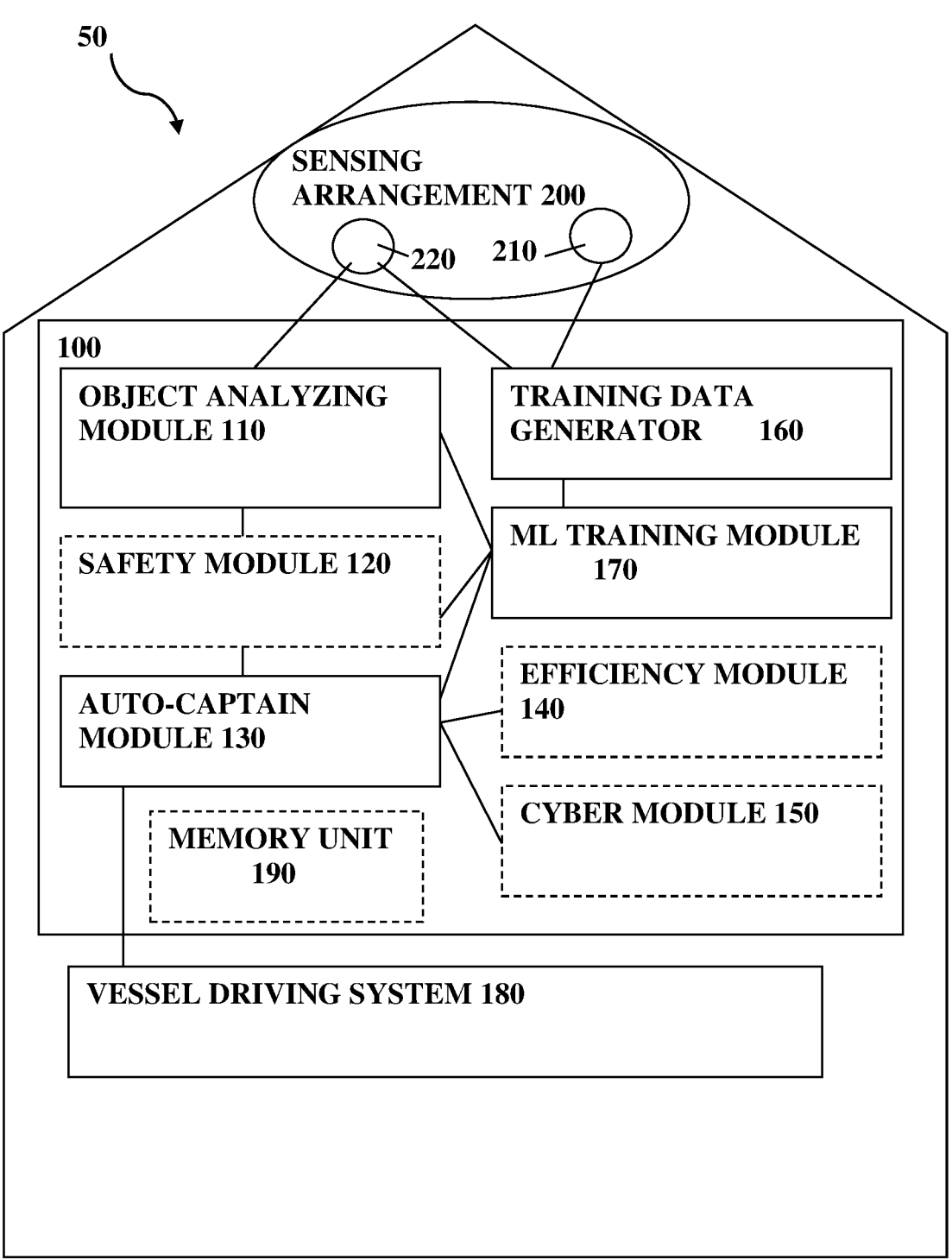
FIG. 1 schematically illustrates a vessel, (e.g., marine vessel) according to some embodiments of the present invention.

As indicated above, the present technique provides for automatic and/or autonomously operating vessels, typically marine vessels, capable of continuously learning and updating operation thereof in accordance with collected data on environment and arena of the vessel. In this connection reference is made to FIG. 1 exemplifying a system 50, e.g., vessel such as marine vessel, ship, boat etc. The system 50 may include certain driving system 180 including for example engines, driving and navigation means such as rudder, propellers etc., sensing arrangement 200 and control system 100. The control system is generally configured as computerized control system including one or more processors, memory unit 190, input/output communication ports and may include one or more user interface modules such as display screen and keyboard. The control system 100 is connected to the sensing arrangement 200 for providing operating instructions/commands, and for receiving input sensing data, and is connected to the driving system 180 for providing operational commands on operation of the driving system, and at times for receiving input data on status of the driving system 180. To this end, the control system 100 includes a processor and memory circuitry (PMC) comprising one or more processors and memory and operating one or more artificial intelligence (AI) modules. The one or more processors of the control system 100 can be configured to execute several functional modules in accordance with computer-readable instructions implemented on a non-transitory computer-readable memory 190. Such functional modules are referred to hereinafter as comprised in the PMC.

The sensing arrangement 200 includes one or more imagers or camera units 210 configured for collecting image data in visible and/or infrared spectra of surroundings of the vessel, and a radar unit configured for scanning surroundings of the vessel 50 using RF radiation. In this connection the terms camera unit or imager is to be understood broadly as relating to unit configured for collecting input data about it surroundings using optical wavelength ranges and possibly including JR and/or UV wavelengths.

The control system 100 may include auto-captain module 130 configured for managing operations of the vessel 50. The auto-captain module 130 is generally configured for obtaining input data, e.g., including data on selected route of the vessel, sensing data on environment around the vessel and data on operation and effectiveness of the driving system 180. The auto-captain module 130 is configured for processing the input data and determine selected operation of the driving system 180 for maneuvering vessel 50, varying path and resolving path conflict if needed. The auto-captain module 130 may also operate to raise alerts and provide route change recommendations as needed, and to communicate data on vessel status and alerts to vessels personnel (if any) and/or to a remote control-center and/or other vessels. Generally, the auto-captain module 130 may utilize pre-trained AI module for processing input data utilizing pre stored data and data on vessel's condition. Such data may include almanac data indicative of solar and lunar paths, star maps, weather conditions, lighting conditions etc.

It should be noted that typically, the vessel 50 may include auto-pilot module operable for navigating the vessel along a predetermined route to a selected destination. The auto-pilot module may be associated with driving system 180, and/or with auto-captain module 130.

The auto-captain module 130 may be connected to safety module 120 for receiving input data and operational recommendations of various safety issues around the vessel 50. Such safety issues may be associated with various objects around the vessel 50, changes in environmental conditions etc. The safety module may utilize an AI module trained on various situations with proper safety relates issued and resolution options. Additionally, the auto-captain module may also be connected to an efficiency module 140 configured for receiving and processing data on operation of the driving system 180 and provide operational recommendations on operation for optimizing efficiency, e.g., fuel efficiency, electrical efficiency, time saving etc. The auto-captain module 130 may also be connected to a cyber module 150 configured for monitoring input and output communications and detecting and intercepting various cyber security threats. To this end, the cyber module may be configured for monitoring and processing input communication and verifying signatures of operational commands in accordance with allowed command input paths.

Generally, the auto-captain module 130 may be operable based on imagery input collected by the one or more imagers or camera units 210. This is to comply with IMO regulations requiring a lookout on marine vessels. To process collected imagery data and detect and analyze object therefrom, the control system 100 may include an object analyzing module 110 configured for receiving and processing input imagery data from the one or more camera units 210 and for identifying existence of objects in the imagery data, determine object location, classify type of the objects, and provide object data to the auto-captain module 130 and/or safety module 120.

Typically, the auto-captain module 130 and/or the safety module 120 may also utilize data from Automatic Identification Systems AIS module (not shown) for determining location and/or identity of marine vessels detected in vicinity of vessel 50. AIS system is generally required module in marine vessels, providing globally accessible data on location and identities of ships, boats, platforms, and other marine vessels.

The object analyzing module 110 may generally be configured to utilize AI processing trained by machine learning, e.g., continuously trained by ML training module 170. The object analyzing module 110 is trained on object recognition and classification of various objects that may be detected in environment where the vessel may be used. For example, vessel 50 may be a marine vessel such as ship or any other type of vessel for use in transportation on water. Accordingly, the object analyzing module 110 may be trained on recognition and classifying of marine vessels of various types, raft, marine bound platforms (e.g., oil rigs), as well as icebergs, land mass, islands, or shore regions. The object analyzing module 110 is preferably trained for object recognition and classification in various weather conditions typically occurring during marine travel such as rain, fog etc. the object analyzing module may also operate to determine correlation between input sensory data (image data and/or radar data), location data providing by vessels positioning system (e.g., GPS) and AIS data on identity of various marine vessels located in vicinity of vessel 50. Additionally, the object analyzing module 110 may be trained to determine object and/or environmental features such as object lights, smoke, flags, shape, sails, vessel vector and maneuvers, rear water trail, front (nose) water wave, water foam and more. Further, the object analyzing module 110 may be trained for recognizing land regions such as islands and shore.

The present technique further utilizes one or more radar units 220 associated with the sensing arrangement, a training data generator 160, and ML training module 170 to enable continuous learning of the vessel 50. The radar unit 220 utilizes RF signals for obtaining data on environment surrounding the vessel 50. More specifically, radar unit 220 operates to transmit RF signals toward a first field of view around the vessel 50 and collected data on reflect RF signals reflected from various objects in a first field of view around the vessel 50. Thus, the sensing arrangement 200 is configured to provide input sensing data including radar data indicating of RF reflection data from a first field of view, and imager data collected by the one or more imagers/camera units 210 from a second field of view. Typically, the first and second fields of view are at least partially overlapping. Further, in some preferred embodiments, the first and second fields of view include 360° horizontal field of view around the vessel, and may include selected vertical field of view, e.g., about 30° vertical field of view.

The training data generator 160 is configured to receive input data from the sensing arrangement 200 where the input data includes radar input data and imagery input data. The training data generator 160 is configured for processing the radar input data to determine data indicative of one or more reflecting objects. Typically, in marine environment, the radar data may include waves' reflection background, accordingly the processing may be directed at identifying reflections over a background noise associated with reflection of RF signal from waves around the vessel. Generally, such background noise may be filtered out by one or more processing units associated with the radar unit 220, or in some configurations by a suitable filtering module of the system 100. The training data generator 160 may include a radar signal analyzer (not specifically shown) configured for analyzing the collected radar signals indicative of reflections over noise thresholds and determining radar meta-data on objects causing such collected reflection. The radar meta data may include various data pieces on objects reflecting the RF signals forming radar signature of the object. The radar meta data generally includes data on object range, object location, azimuth and elevation, and radar signature data such as data on object size, object aspect, effective reflection properties, reflection size, doppler shift components, closing speed and any other object feature that can be determined using radar technology.

The training data generator 160 is further configured for processing the input imagery data, and specifically sections of the imagery data associated with one or more locations where radar reflections are identified. In this connection, the training data generator 160 may utilize one or more image processing and object recognitions techniques for determining data on one or more objects captured in the imagery data. The training data generator 160 operates for determining one or more image data pieces, typically being one or more sections of said imagery data, associated the locations in the field of view where reflecting objects are identified. These image sections may generally include image data of the objects identified in the radar data.

The training data generator 160 may include a correlator module (not specifically shown) configured for determining correlation between radar meta-data associated with a detected object, and image data depicting the corresponding region, and at times using data determined on objects from the imagery data. Generally, a high correlation may indicate that the imager data section is associated with the same object as detected in the radar input data. The threshold determining sufficient correlation level may be associated with day or night, weather, and generally visibility conditions.

Using said radar meta-data, the training data generator 160 is further operable for generating label data and attaching the label data to the respective one or more image data pieces to form output data. The output data is generally in the form of one or more image data pieces, being sections of imagery data collected by the one or more camera units 210, labeled by radar meta-data obtained from the respective locations. Thus, the training data generator facilitates a connection between radar meta-data obtained from one or more reflective objects and image data of the respective one or more objects. The output can therefore be used to enable machine learning training for object detection based on the imagery data.

The retraining data generator 160 may also utilize AIS and location (e.g., GPS) data to further include marine vessel identity in the image label data. This enables to further allow training based on ships' identity and corresponding visual features in addition to radar meta data.

Generally, As the radar input data and imagery data may be associated with slightly different fields of view, the training data generator 160 may be connectable to the one or more imagers/camera units 210 to provide operational instructions on obtaining imagery data from one or more selected locations. Thus, in cases where field of view of the input imagery data (second field of view) does not include the respective locations where radar reflected signals are identified, the training data generator 160 may instruct the one or more camera units 210 to obtain image data from the respective locations where objects are identified in the radar input data.

The training data generator 160 may store the labeled image data pieces in the memory unit 190 for later use. Additionally, the training data generator 160 may provide the labeled image data pieces to the ML training module 170 for additional ML training of AI modules including one or more of the object analyzing module 110, safety module 120 and auto-captain module 130. The ML training module 170 may operate for additional training periodically or in response of collection of labeled image data pieces of selected volume. This enables the vessel's control system 100 to continuously train and learn based on various objects and different environmental conditions experienced during operations. Thus, removing the limitations associated with controlled ML training based on pre-provided training data. Updated learning may provide automatic or autonomic marine vessels with updating ability to identify and classify nearby objects in various weather conditions such as rain, fog, etc., as well as in different illumination conditions between day and night and different weather or general visibility conditions.

Generally, the ML training module may utilize one or more machine learning techniques, and a set of labeled image data pieces collected by the training data generator 160 throughout a selected collection period, for training the one or more AI modules of the object analyzing module 110, safety module 120 and auto-captain module 130. The ML training module may utilize auto ML techniques and/or other machine learning training techniques for training the AI modules. The training techniques may include operative restrictions associated with IMO regulations. Further, the training is typically constructive and utilizing previous training.

Typically, the auto-captain module 130 may utilize various data for operating the vessel. For example, the auto-captain module 130 may utilize pre-stored data tables such as sun tables including sunrise and sunset data and solar paths, lunar tables including lunar path and rise and set times, location data (e.g., using a location system such as global positioning system GPS), acceleration data (e.g., provided by one or more inertial accelerometer), marine streams map, geographical map, and any other data that may be used for controlling the vessel's operation. The auto-captain module 130 may also be configured for communication with one or more remote stations for receiving weather updates and forecast data, and data about wave heights, visibility, path of other nearby vessels etc. The auto-captain module may utilize such data for operating the vessel 50 in accordance with target objective. More specifically, the auto-captain module 130 may operate to determine vessel route, operate auto-pilot module for maintaining route or change route and/or speed in response to varying weather conditions or detected possible route conflicts.

The control system 100, typically using the auto-captain module 130 and/or safety module 120 may be configured for utilizing data on varying conditions and/or data on various objects located in vicinity of the vessel 50 to resolve routing conflict and thus avoid danger of collision. To this end the auto-captain module 130 may be trained on marine route protocols and route conflict rules.

For example, in response to input data from the object analyzing module 110 on detection of one or more marine vessels in vicinity of the vessel 50, the auto-captain module 130 may operate one or more signaling units (not specifically shown) such as horn, light signal, RF beacon etc. and recalculate navigation of vessel 50 in accordance with training thereof.

Figure 2:
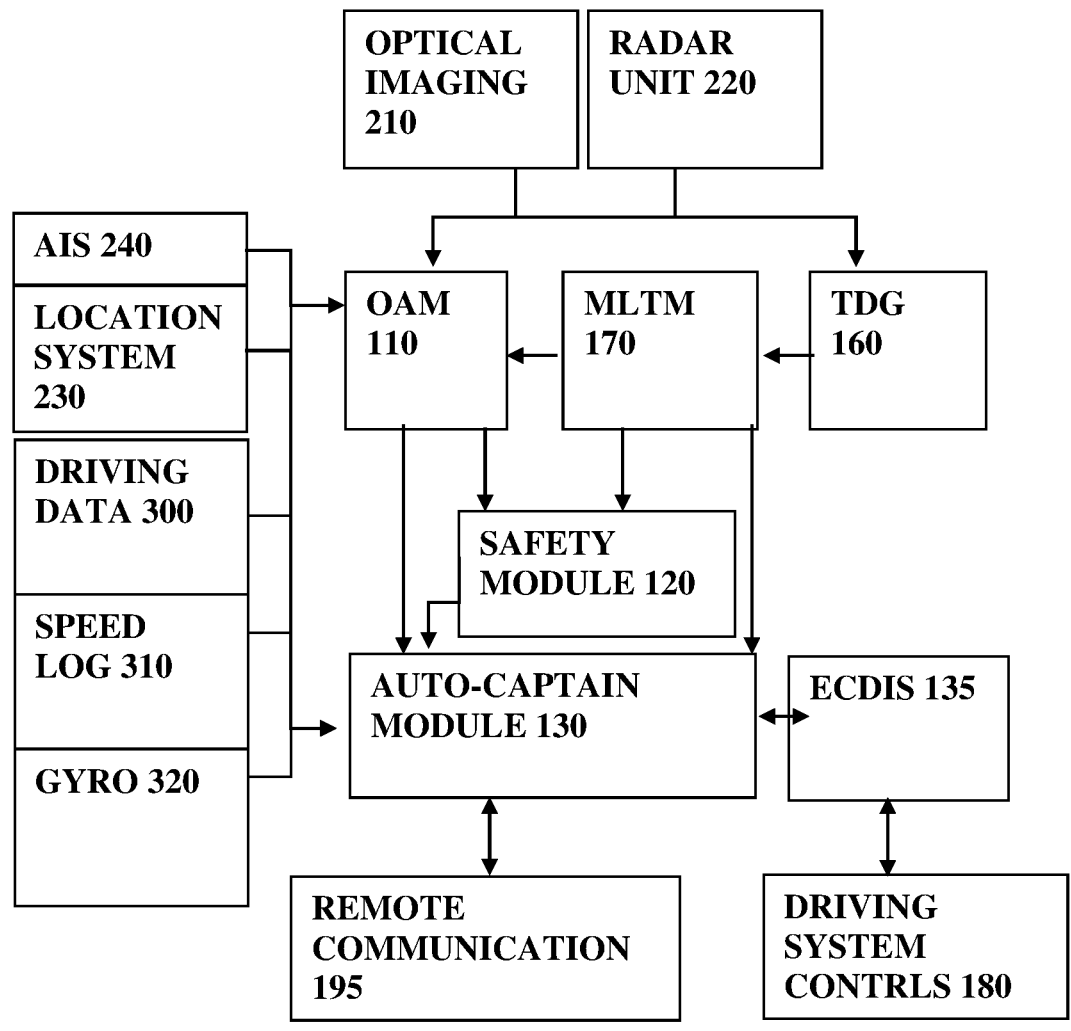
FIG. 2 exemplifies main modules and operation of a vessel according to some embodiments of the present invention.

Reference is made to FIG. 2 exemplifying a schematic architecture chart of vessel 50 according to some embodiments. As shown, the auto-captain module 130 is configured for obtaining and/or receiving input data on vessel operation and utilizing the input data in accordance with pre-stored data and ML training for operating vessel driving system 180. Further, the auto-captain module 130 may communicate with one or more remote stations 195 when needed. The input data may include one or more data pieces associated with optical imaging data 210 obtained by one or more camera units, radar input data 220 obtained by a radar system, data on nearby ships obtained from AIS 240, location data 230, driving status data 300, speed log 310 and vessel orientation or gyro data 320. As indicated above, external input data such as input imagery data 210 and radar input data 220 may be processed for object recognition by object analyzing module (OAM) 110 to determine and classify objects identified in the collected data. Additionally, the object analyzing module 110 may process sensing data including imagery data and radar input data to determine data on waves, line of the horizon, weather, and general visibility conditions.

If objects or other conditions that may endanger the vessel are detected in sight or within a selected range, the respective data is transmitted to the safety module 120 to determine risk level (e.g., risk of collision). The auto-captain module 130 utilizes such data for determining operation of the vessel. The auto-captain module 130 is configured for processing the different types of input data described above, and determine condition associated with one or more actions for assisting the vessel to establish one or more operation objective. For example, the auto-captain module 130 may operate to determine level of potential conflict and select suitable conflict resolution operations. Condition resolving operations may include for example, generating instructions to operate vessel signaling units and alert detected ships in vicinity of the vessel 50. If the safety module 120 determines that route of the detected ship/object has potential for collision that exceeds a selected or predetermined threshold, the auto-captain module 130 may generate operational instructions to operate vessel driving system 180 and vary route of the vessel to avoid such collision in accordance with selected route variation options.

Generally, the auto-captain module 130 may be associated with pre-stored and/or routinely updated Electronic Chart Display and Information System ECDIS 135 including data on traffic and route plans, alert interpretation data and International Regulations for Preventing Collisions at Sea (COLREG). The auto-captain module 130 may utilize the pre-stored data for determining suitable condition resolving operations in response to different situations.

As indicated above, different data sources are used providing input data to the auto-captain module 130. The auto-captain module may determine weights for data of different sources and determine status of the vessel and its surroundings and proper condition resolving operations. Accordingly, the input data may include various types of input data including for example, environmental data in addition to data associated with different objects detected around the vessel. Environmental data may be determined by processing of imagery data collected by the one or more imagers. For example, the environmental data may include light level data, relative horizon line, sea clutter level (foam of waves and waves itself), sun or moon glittering, weather, and visibility conditions, etc. The auto-captain module 130 may also utilize pre-stored data from the memory unit (not shown) to obtain pre-stored data or communicate with one or more remote stations and/or additional sensors that may be location of the vessel. Pre-stored data or data obtained by remote communication may include solar and lunar almanac data, world ship database, e.g., obtained by AIS system. Further the additional data may include weather conditions such as temperature, clouds data, humidity, sea water spray levels, fog conditions, rain level (e.g., in millimeters), wave size/height, visibility range etc.

Figure 3:
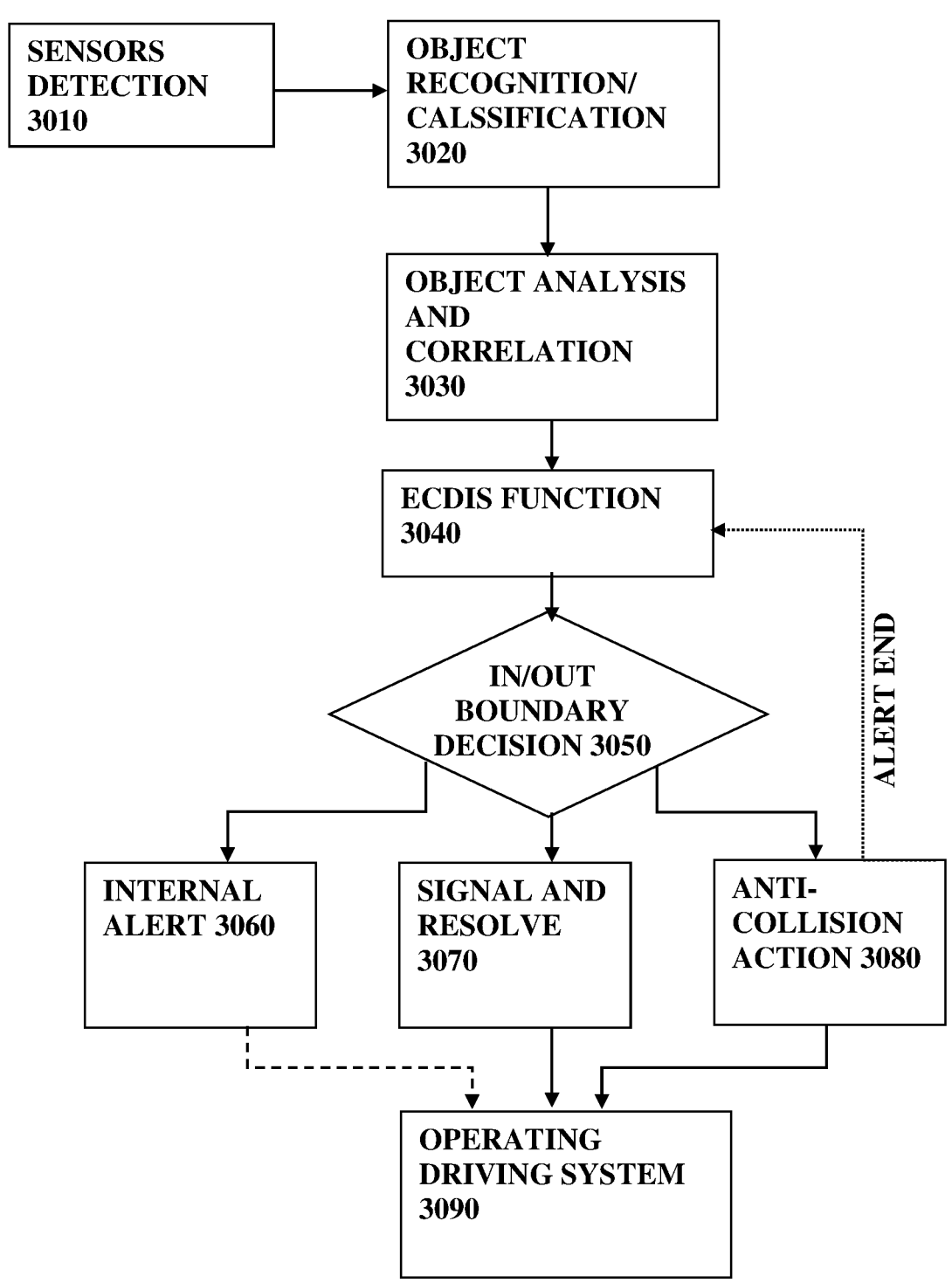
FIG. 3 illustrates decision making operation in automatic and/or autonomic vessel according to some embodiments of the present invention.

As indicated above, the auto-captain module 130 may be formed by or utilize one or more artificial intelligence modules trained with one or more decision trees in accordance with predefined rules for resolving various conflict types. In this connection, reference is made to FIG. 3 exemplifying decision-making scheme according to some configurations associated with detection of one or more objects in vicinity of vessel 50. Sensing data is collected by the sensing arrangement and transmitted to the control system 100. The control system is operable by vessel navigating instruction operating the one or more processors for processing the input data from the sensing arrangement 3010. Such data may include imagery data from one or more imagers, radar data and/or other sensors. The detected sensor data may generally be transmitted for object recognition/classification for determining one or more features of the object 3020. The recognition and/or classification may utilize training of the object analyzing module 110 and may also include data obtained from positioning system combined with AIS data on ship identity. The object data may be further analyzed and/or correlated 3030 along certain time period, to determine probable trajectory/path of the object. The analysis may include determining probability of path conflict and/or collision. This may be associated with determined path of the detected object, and/or planned path of the vessel 50. The decision making based on the detected object is typically associated with ECDIS data 3040 including guidelines on conflict resolution, navigation, and traffic regulations, signaling protocols etc. Based on the analysis and ECDIS guidelines, the processing determines level of path boundary conflict with the detected object 3050. In case no path boundary conflict is determined, e.g., detected object is out of vessel path envelope, the system may operate to raise an internal alert 3060. If the detected object is within the envelope, but does not pose any risk of conflict, proper external signaling (e.g., acoustic signal using a horn, RF, or visual signal) may be used 3070. Such signaling may typically resolve various possible path conflicts. However, if the detected object poses a path boundary conflict that may result in collision above certain probability threshold, the decision may also be associated with suitable operation of the vessel driving system 3090, e.g., to verify that risk of trajectory conflict is minimized. In cases where the detected object and analysis thereof indicate possible trajectory conflict path boundary conflict that relates to a risk of collision above a predetermined threshold, proper anti-collision action set 3080 is taken. Such anti-collision action set may include one or more operational actions for operating at least the vessel driving and signaling systems and is typically determined in accordance with ECDIS and the corresponding guidelines. Thus, the auto-captain may operate for varying operation of the driving system 3090 to correct vessel trajectory and remove risk of collision.

As indicated above, the present technique further provides continuously learning ability for machine learnings system of control system 100. Such continuous learning ability may be associated with object recognition of various objects detected in vicinity of the vessels 50. Reference is made to FIG. 4 exemplifying a technique for continuously generating training data in the form of labeled image data pieces according to some embodiments of the present technique. As described above, the technique may be implements using one or more processors and memory circuitry such as control system 100 described above. As shown, the technique includes providing input radar data 4010 obtained by the radar unit and providing input imagery data 4020 obtained by the one or more camera units. Generally, the radar input data is indicative of a first certain field of view and the imagery data is indicative of a second field of view, where the first and second field of view are at least partially overlapping. In some preferred examples, the radar data is collected from a field of view extending 360° horizontally and at least 30° in elevation. The imagery data may preferably be collected from a similar field of view, however certain delay may occur between collection of radar data and imagery data of the same section of the field of view.

The input data formed by radar input data and imagery data is processed for generating labeled image data. The input radar data may be filtered to remove noise 4015, e.g., associated with reflection from waves in marine environment. It should be noted that such filtering may utilize input data on weather and wave condition to relate to variation in wave reflections due to different sea conditions. Filtering of the radar data may generally be provided by the radar units. The radar data is processed for detection of one or more reflection signals associated with various objects 4030 in vicinity of the vessel. Upon detection of an object, location 4035 and radar meta-data 4050 of the object are being determined. The location of the object may be determined as relative location with respect to vessel 50, and/or using suitable processing and vessel positioning system as global location of the object. The radar meta-data is determined based on input radar reflection signature, doppler shifts, and respective variations between detection instances in case the object is detected in two or more radar sweeps. The meta-data may include one or more data pieces such as: object size, aspect, cross-section, distance, azimuth, elevation, object location, closing speed, doppler shifts, and object radar signature. In some configurations, typically for marine vessels, the present technique may utilize AIS data on presence of one or more marine vessels in the location of the detected object 4060. The AIS data typically include identity of marine vessels and their global position, thereby enabling to obtain direct information of almost complete data on detected ship, including flag data, size, direction, signature colors etc.

Utilizing the object relative location, the corresponding section of the imagery data is selected and cropped for generating image data piece 4040, typically depicting the object. In cases the imagery data does not include image data of the respective location, the technique may operate to generate operational instructions to one or more of the camera unit, for collecting image data of the respective location.

In some configurations, the image data section and radar meta data may undergo further processing for determining correlation between the object detected in the imagery and radar data in corresponding location coordinates 4045. To this end, the technique may include processing of input imagery data for object detection, as well as for additional data such as wave height and direction, horizon curve angle, cloud data etc.

Upon determining correlation between imager data sections and radar signals of detected objects is above a selected threshold, the related data is used as labeled output data. Some dimly detected object reflections may be omitted in response to correlation level with imagery data below threshold. The threshold for correlation is generally determined based on weather, illumination, and other visibility conditions.

The image data pieces and the collected data including radar meta-data, and AIS data when used, is used for generating labeled output data 4070. The labeled output data facilitates and provides a connection between the radar input data and the imager data associated with an object detected in vicinity of the vessel. The present technique may typically operate for continuously collect input data and generate labeled output data indicative of various detected objects ranging from other marine vessels, marine platforms, boats, oil rigs, icebergs, islands and shoreline, and any other type of objects detected around the vessel. The collected labeled output data may generally be used for continuously or routinely training ML modules of the control system for recognizing various objects around the vessel 4080. This enables to provide an automatic and/or autonomous vessel capable of continuous learnings over those provides by initial training and periodic updates.

Figure 5:
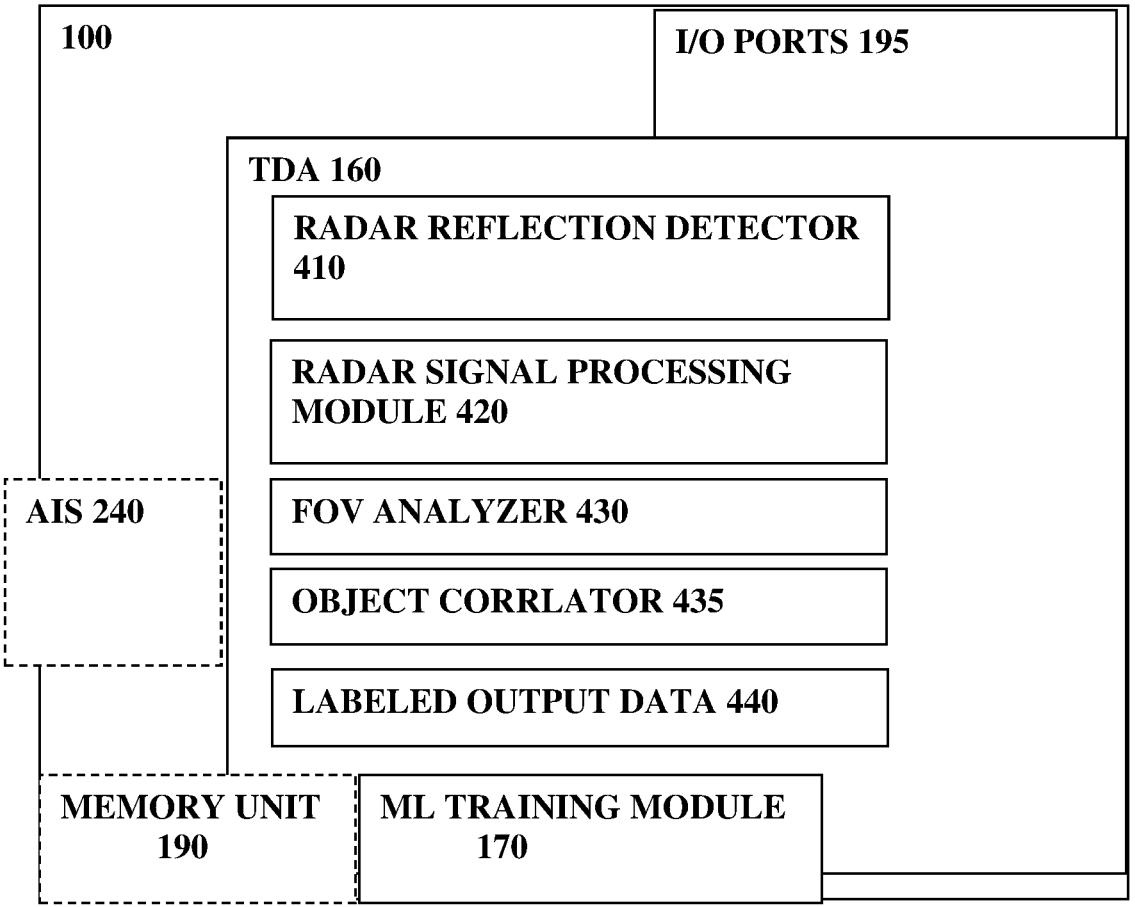
FIG. 5 schematically illustrates system for continuously generating labeled training data according to some embodiments of the present invention.

FIG. 5 exemplify configuration of a system for generating labeled training data according to some embodiments of the present technique. As described above, the system may be configured in the form of control system 100 or training data generator (TDG) module 160. Generally, the system 100 includes one or more processor and memory circuitry (PMC) utilizing one or more processors, memory unit 190, and communication module, I/O port 195, connectable to one or more camera units and one or more radar units. The TDG 160 is configured for receiving input data associated with at least radar input data and imagery input data and for processing the input data to generate one or more labeled image data pieces and to provide the labeled image data to the ML training module 170 to enable continuous training. The labeled image data pieces are generally labeled based on connection between received signal reflections of the radar data and corresponding sections of the image data, depicting objects around the vessel. In this example the TDG 160 may include software or hardware modules including radar reflection detector 410, radar signal processing module 420, field of view analyzer 430, object data correlator 435, and labeled output data generator 440.

The radar reflection detector 410 is configured to receive data on collected RF signals, collected by the radar system using one or more collection beams, and process the collected signals to determine signal portions indicative of objects in the field of view. To this end, the radar reflection detector 410 may utilize noise filtering, summation of RF collection channels with suitable phase variations, and/or peak detection techniques, for detecting collected signal portions indicative of objects over background nose. Upon detecting reflection signal caused by one or more objects, the radar reflection detector 410 transmits data on the detected reflections to the radar signal processing module 420 for processing the reflected signal components and determining one or more features of the object based on the reflected RF signals. The radar signal processing module 420 may utilize various processing algorithms for determining data on one or more objects reflecting the collected RF signals. Such processing may include determining Fourier components of the collected signals, determining Doppler shifts, processing collected channels and determining one or more additional collect beams to distinguish reflected signals from one or more objects located in a group, etc. The processing is generally configured to determine radar meta-data on the objects including data pieces selected from: number of objects, location of object, azimuth, elevation, distance from vessel, object size, length, width, height, object aspect, cross-section closing speed, partial doppler shifts (e.g., associated with internal movement of elements within the object), etc. The radar signal processing module 420 may further utilize two or more detection instances of a common object for determining transverse speed of the object. The so-determined radar meta-data is packaged in labeling data, for labeling of corresponding section of the imagery data. Also, the radar signal processing module 420 may utilize positioning data (e.g., GPS data) to determine global position of the detected object based on position of the vessel and relative location of the object with respect to vessel 50. To this end, the radar signal processing module 420 provides at least data on object location, generally including azimuth, elevation, and distance, to the field of view (FOV) analyzer 430.

The FOV analyzer 430 receives data on location of the detected one or more objects and imagery data collected by the one or more camera units and operates for processing the imagery data to determine one or more image data pieces associated with sections of the imagery data collected from the respective location where objects are detected. The FOV analyzer 430 may utilize data on object distance and object size/cross-section, to determine size of the image section, typically based on solid angle to be covered in the image section. Generally, if the imagery data does not include sufficient data of the respective location, the FOV analyzer 430 may generate a request to the sensing arrangement to operate the one or more camera units and collect additional image data of the respective location.

The FOV analyzer 430 may include, or be associated with, image processing module configured for processing the one or more relevant sections of the imagery data to determine data on objects appearing in the respective sections. To this end the FOV analyzer 430 may utilize imagery data obtained in different time instances, or one or more different times, enabling detection of moving objects over generally still background. Additionally, or alternatively, the FOV analyzer 430 may utilize gradient detection or other techniques (including AI image processing) for determining data on objects appearing in the imagery data.

The object correlator 435 may be configured for processing the different data pieces indicative of detected objects. More specifically, the object correlator 435 is configured to receive radar meta data on detected objects, and image data section of the respective one or more locations, and to process the radar and image data to determine correlation between object detection in the different technologies. The correlation level may be included in labeling data. Additionally, for correlation level may be processed in accordance with weather, visibility and/or illumination conditions. If correlation between sensor representations of detected objects and below selected threshold, the technique may operate for obtaining additional sensing data to improve correlation, and/or omit the respective sensing data.

Thus, the cropped image data piece and the radar meta-data are transmitted to the labeled output data generator 440 to be packaged as labeled output data. As described above, the labeled output data generator may utilize the AIS system 240 and/or remote communication, to obtain data on one or more marine vessels that may be found in the location of the detected objects. Such AIS data, if exists, may provide additional labeling data fields enhancing value of the labeled output data. For example, AIS data may indicate ship identity, clarifying that the detected object is a ship of specific type. Additionally, AIS data may indicate ship flag data, color scheme, heading, etc. The labeled output data generator 440 thus operates to generate output data in the formed of labeled image data pieces formed by image of one or more objects and radar meta-data collected on the object and may also include AIS data on the objects. The labeled output data is typically stored in the memory unit 190 for later use and is generally used to enable continuous training of ML object analyzing modules, using the ML training module 170.

Thus, the present technique utilizes combined RF and optical signal collection for continuously generating labeled image data and enable continuously learning autonomic vessels. The present technique is particularly relevant for use in marine vessels, utilizing a generally parse field of view allowing the technique to uniquely and efficiently correlate radar input data and imagery data on common objects.

The invention claimed is:

1. A method implemented by one or more processors and memory circuit, the method comprising:

receiving input data comprising at least radar input data indicative of a first field of view and imagery input data indicative of a second field of view being at least partially overlapping with said first field of view;

processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects;

processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data; and providing said output data comprising one or more image data pieces and labeling data for training processing of one or more artificial intelligence (AI) modules to thereby enable continuous training for object recognition and/or classification in said imagery data.

2. The method of claim 1, wherein said radar meta-data comprises one or more data pieces indicative of radar signature of one or more objects reflecting a radar signal.

3. The method of claim 1, wherein said radar meta-data comprises one or more data pieces selected from the group of: object size, object distance, object closing speed, and object aspect, object location, Angles, azimuth, vector, Doppler, and cross section & signature.

4. The method of claim 1, wherein said AI module is adapted for object detection in marine environment, enabling collision prevention in a marine vessel in accordance with said imagery data.

5. The method of claim 4, wherein said AI module is further configured for receiving location data from one or more location detection units (GPS) and for determining navigational route of said marine vessel.

6. The method of claim 5, wherein said AI module is connectable to steering controls of said marine vessel, thereby enabling at least partially autonomous operation of said marine vessel.

7. The method of claim 1, further comprising processing the radar input data to determine data indicative of one or more reflecting objects within an said first field of view, and upon determining that one or more respective locations where reflecting objects are identified being outside of said second field of view, generating an operation command to obtain imagery data from said one or more respective locations.

8. The method of claim 1, further comprising providing data on position of said one or more reflecting objects and utilizing an automatic identification system (AIS) and said position of said one or more reflecting objects to obtain data on identity of said one or more reflecting objects, using said data on identity for generating additional label data and generating output data comprising said one or more image data sections and said label data and said additional label data.

9. A marine vessel management system, comprising:

at least one processor and memory circuit, one or more camera units, and one or more radar units, wherein the at least one processor comprises an auto-captain module, an object detection training module, and a training data generator;

wherein the auto-captain module comprises a artificial intelligence (AI) module continuously trainable based on labeled image data and is configured to receive imagery data from said one or more camera units, processing said imagery data to determine data on one or more objects within a selected field of view around said marine vessel;

wherein the training data generator is configured and operable for receiving input data from said one or more camera units and one or more radar units, said input data comprises at least radar input data indicative of a first field of view and imagery input data indicative a second field of view being at least partially overlapping with said first field of view, processing the radar input data to determine data indicative of one or more reflecting objects within an overlapping portion of said first field of view, determining one or more respective locations within said second field of view where said one or more reflecting objects are identified, and obtaining radar meta-data of said one or more reflecting objects; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data;

wherein the object detection training module is configured to receive said output labeled data, and update training of said AI module of said auto-captain module for detecting objects based on said output labeled data, thereby enable continuously updating training of said AI module.

10. The marine vessel management system of claim 9, wherein said AI module is adapted for processing input imagery data received from said one or more camera unit and determine data on one or more objects identified in said imagery data, to thereby provide object recognition of one or more objects from said imagery data.

11. The marine vessel management system of claim 9, wherein said radar meta-data comprises one or more data pieces indicative of radar signature of one or more objects reflecting said radar signal.

12. The marine vessel management system of claim 9, wherein radar meta-data comprises one or more data pieces selected from the group of: object size, object distance, object closing speed, object aspect, object location, Angles, azimuth, vector, Doppler, cross section, and signature.

13. The marine vessel management system of claim 9, wherein said AI module is further configured for receiving location data from one or more location detection units (GPS) and for determining navigational route of said marine vessel.

14. The marine vessel management system of claim 9, wherein said auto-captain module is connectable to steering controls of said marine vessel and configured for varying at least one of speed and heading of said marine vessel to thereby enable at least partially autonomous operation of said marine vessel.

15. The marine vessel management system of a claim 9, further comprising processing the radar input data to determine data indicative of one or more reflecting objects within an said first field of view, and upon determining that one or more respective locations where reflecting objects are identified being outside of said second field of view, generating an operation command to obtain imagery data from said one or more respective locations.

16. The marine vessel management system of claim 9, further comprising automatic identification system (AIS) module, wherein said training data generator is further configured to provide data on position of said one or more reflecting objects and obtain from said AIS module data on identity of marine vessels located at said position, using said data on identity for generating additional label data and generating output data comprising said one or more image data sections and said label data and said additional label data.

17. A system for generating labeled training data, the system comprising:

a processing utility comprising one or more processors, memory unit, and communication module connectable to one or more camera units and one or more radar units; the processing utility is configured for receiving input data comprising at least radar input data indicative of a first field of view and imagery input data indicative of a second field of view being at least partially overlapping with said first field of view; processing the radar input data to determine data indicative of one or more reflecting objects within an overlapping portion of said first field of view, determining one or more respective locations within said second field of view where said one or more reflecting objects are identified, and obtaining radar meta-data comprising one or more data pieces indicative of radar signature of one or more objects reflecting said radar signal; processing said input imagery data said respective locations in an overlapping portion of said second field of view, and determining one or more image data pieces corresponding with one or more sections of said imagery data associated with said one or more reflecting objects, using said radar meta-data for generating label data and generating output data comprising said one or more image data sections and said label data, thereby facilitating connection of said radar meta-data with image data of one or more objects to enable machine learning training for object detection based on said imagery data;

wherein said processing utility is further configured to provide said output data comprising one or more image data pieces and labeling data for training processing of one or more AI modules to thereby enable continuous training for object detection in said imagery data.

18. The system of claim 17, wherein said processing utility comprises a radar reflection detector, radar signature processing module, and FOV analyzer; said radar reflection detector is configured to receive input data from the one or more radar units and determine data of one or more radar signal reflections indicative of one or more objects in field of view of the one or more radar units, and location of said one or more objects; the radar signature processing module is configured to receive and process data on said radar signal reflections and determine data on radar signature of said one or more objects; said FOV analyzer is configured to receive input imagery data from said one or more camera units and said data on location of said one or more object, and to process the input imagery data to determine one or more image data pieces associated with said location of said one or more objects; the processing utility generates output data comprising said image data pieces and labeling data associated with said data on radar signature of said one or more objects thereby generating labeled training data for training of one or more artificial intelligence (AI) modules.

19. The system of claim 17, wherein said one or more AI modules being adapted for object detection in marine environment, enabling collision prevention in a marine vessel in accordance with said imagery data.

20. The system of claim 17, wherein said one or more AI modules are connectable to steering controls of said marine vessel, thereby enabling at least partially autonomous operation of said marine vessel.

\* \* \* \* \*